United States Patent [19]

Gagas et al.

[11] Patent Number: 4,534,378
[45] Date of Patent: Aug. 13, 1985

[54] GATE VALVE ADAPTOR

[75] Inventors: Michael S. Gagas, Milwaukee; Stanley J. Gagas, Oak Creek, both of Wis.

[73] Assignee: Adaptor, Inc., Milwaukee, Wis.

[21] Appl. No.: 495,148

[22] Filed: May 16, 1983

[51] Int. Cl.³ .............................................. F16L 5/00
[52] U.S. Cl. ..................................... 137/367; 251/292; 52/20
[58] Field of Search ............... 137/363, 364, 365, 366, 137/367, 368; 251/292; 52/20

[56] References Cited

U.S. PATENT DOCUMENTS

| 250,780 | 12/1881 | Broughton | 137/368 |
| 947,706 | 1/1910 | Takelenburg | 251/292 |
| 2,176,399 | 10/1939 | Garrett | 137/368 |
| 2,596,532 | 5/1952 | Coolidge et al. | 137/368 |
| 4,275,757 | 6/1981 | Singer | 137/363 |

FOREIGN PATENT DOCUMENTS 945422  6/1956  Fed. Rep. of Germany ...... 137/363

Primary Examiner—A. Michael Chambers
Assistant Examiner—Sheri Novack
Attorney, Agent, or Firm—Ronald E. Barry

[57] ABSTRACT

An adaptor for supporting a key box on an underground gate valve, the adaptor including a rectangular metal ring adapted to be seated on the gate valve bonnet flange, a number of radially extending arms positioned to engage the lower edge of the key box bonnet, and a resilient ring positioned between the adaptor ring and the key box flange.

5 Claims, 5 Drawing Figures

GATE VALVE ADAPTOR

BACKGROUND OF THE INVENTION

Gate valves which are used to control the flow of water through underground piping are buried in the ground. In order to operate the valves, a key is used to turn the operating nut of the valve. The key is mounted on the end of a long rod in order to reach the operating nut on the valve. Access to the operating nut is generally provided through a key box having a bonnet that is placed over the gate valve to prevent the operating nut from being buried in the ground. The bonnet is generally supported on wooden blocks located on each side of the gate valve. As a result of settling of the ground or deterioration of the block, the key box bonnet often shifts with respect to the gate valve allowing the ground to enter the bonnet and making it difficult to operate the operating nut.

SUMMARY OF THE INVENTION

The gate valve-key box adaptor according to the present invention, provides a permanent support for the key box bonnet that is unaffected by the surrounding environment. The adaptor is supported on the gate valve to a positive location for the key box bonnet at a level which prevents the ingress soil into the bonnet. The adaptor is provided with a resilient gasket to provide a cushion for the bonnet on the gate valve.

IN THE DRAWINGS

DESCRIPTION OF THE INVENTION

Figure 3:
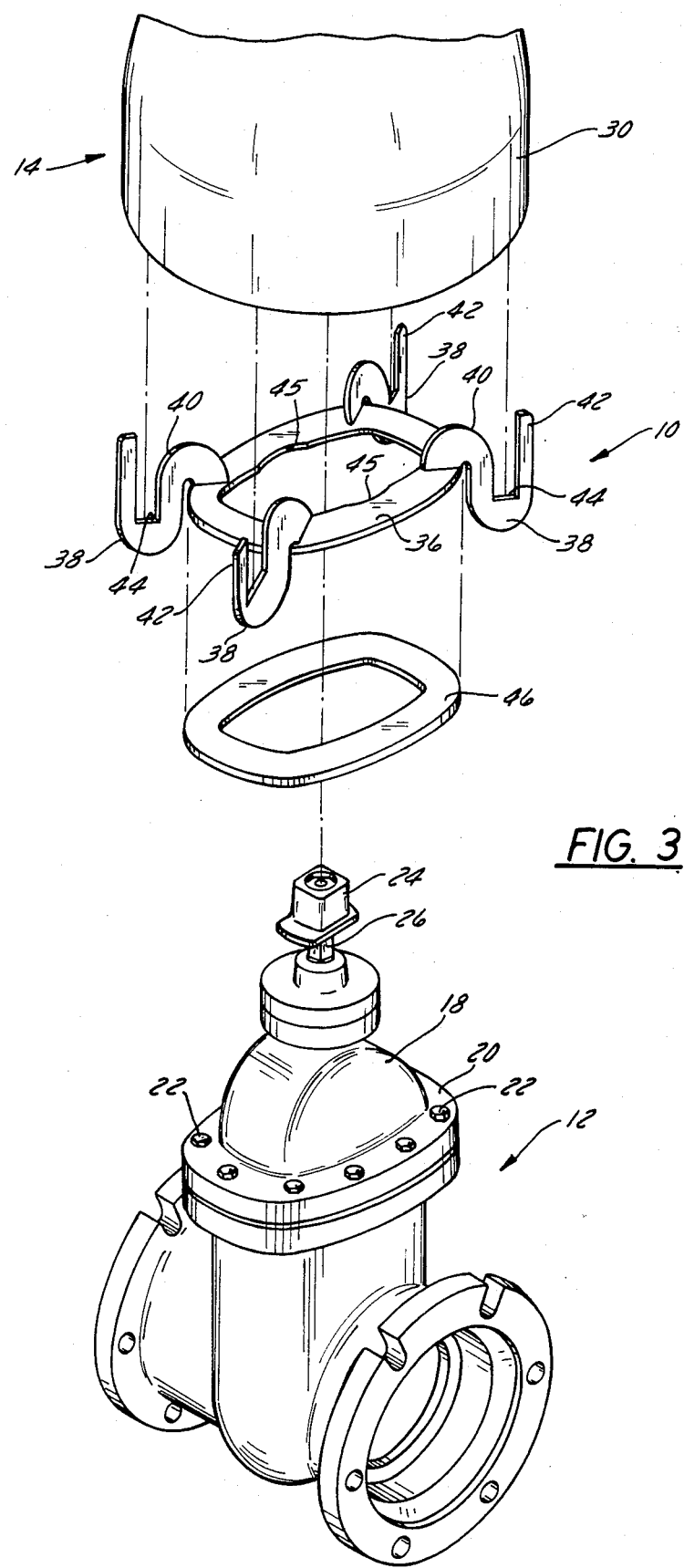
FIG. 3 is an exploded perspective view showing the relationship of the gate valve-key box adaptor to the key box bonnet and the gate valve.

The gate valve-key box adaptor 10 as seen in FIG. 3 of the drawings, is used to support a key box 14 on a gate valve 12. The gate valve 12 is a standard type gate valve which is used to control the flow of water through a water main 16. The gate valve 12 includes a bonnet 18 having a flange 20 secured to the valve by means of a number of bolts 22. The gate valve is controlled by means of an operating nut 24 mounted on the upper end of a stem 26. Gate valves of this type are buried beneath the surface 28 of the ground, generally beneath the normal frost line.

Figure 1:
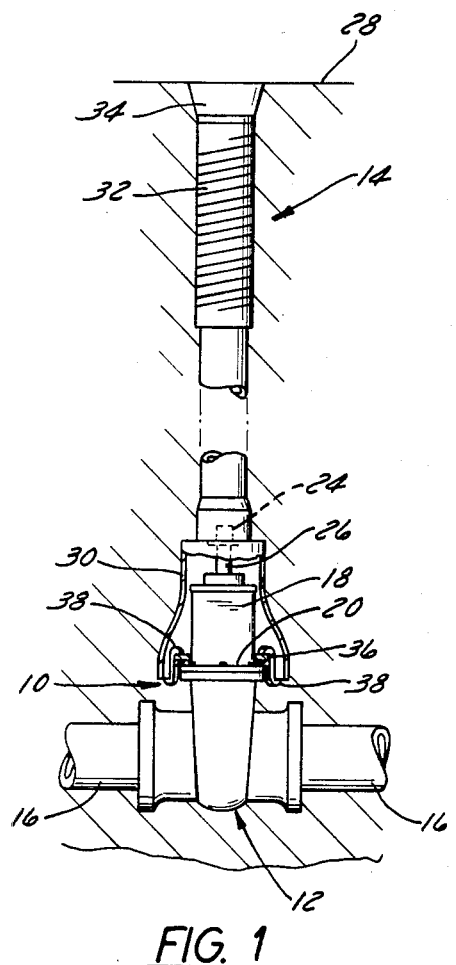
FIG. 1 is a side view in elevation and partly broken away to show a key box bonnet mounted on a gate valve.
Figure 2:
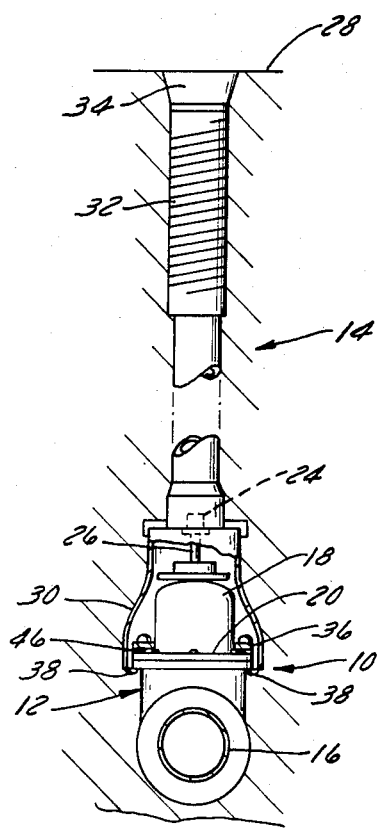
FIG. 2 is an end view partly broken away of the key box bonnet shown mounted on the gate valve.

Access to the operating nut is provided by means of a key box 14 as seen in FIGS. 1 or 2 which includes a key box bonnet 30, a threaded tubular head 32, and a cap or cover 34 provided at the top of the head 32. The bonnet 30 is designed to enclose the top of the gate valve bonnet in order to protect the operating nut. The heads 32 can be raised or lowered to ground level to provide access to the operating nut. The gate valve can then be turned on or off by inserting a key (not shown) through the key box to engage the operating nut 24.

Figure 4:
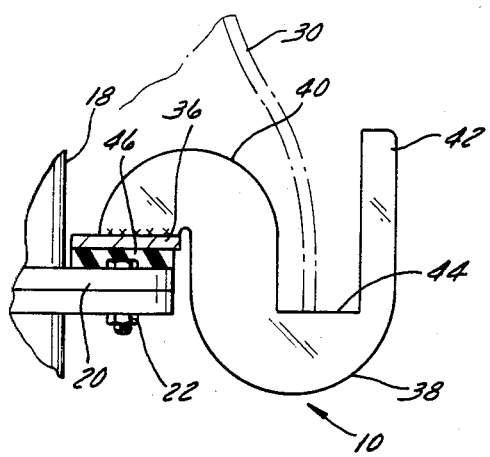
FIG. 4 is a view of one of the adaptor support arms for the key box bonnet.
Figure 5:
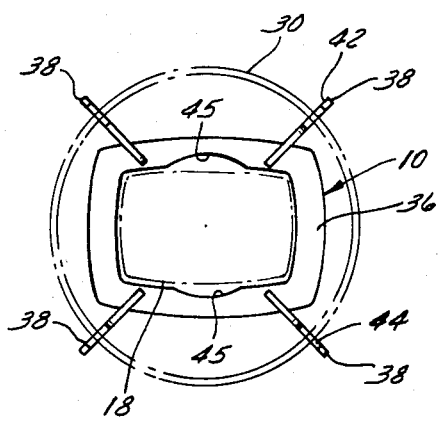
FIG. 5 is a top plan view of the adaptor showing the position of the bonnet on the bonnet supports.

In accordance with the present invention, the gate valve-key box adaptor 10 is provided on the gate valve to positively locate and support the key box bonnet 30. As seen in FIGS. 3, 4 and 5, the adaptor includes a rectangular ring 36 having a configuration generally corresponding to the configuration of the gate valve bonnet flange 20. Means are provided on the ring 36 for supporting the bonnet 30. Such means is in the form of a number of S-shaped arms 38 which extend radially outward from the corners of the rectangular ring. The arms can be secured to the ring 36 by an appropriate means such as welding.

Each arm 38 includes a curved camming surface 40 and a generally vertical guide 42 spaced from the camming surface to provide a seat 44. The key box bonnet 30 is guided into the seats 44 in the arms 38 by means of the camming surfaces 40 and vertical guides 42. It should be noted that the seat 44 is located generally below the level of the bonnet flange 20. The inner surface of the ring 36 may be provided with accurate slots 45 to provide release for the gate valve bonnet 18.

Means are provided for cushioning the mounting of the adaptor on the gate valve 12. Such means is in the form of an elastomeric ring 46 having the same general configuration as the adaptor ring 36. The elastomeric ring is placed on the top of the bonnet bolts 22.

The embodiments of the invention in which an exclusive property or privilege is claimed, are as follows:

1. A gate valve-key box adaptor comprising a flat rectangular ring having a configuration corresponding to the configuration of the bonnet flange of a gate valve, said ring being adapted to be placed on the flange, and a plurality of S-shaped arms extending radially outwardly from said ring and mounted on the corners of the ring, a key box including a botton edge for engaging a portion of each one of said S-shaped arms for supporting said key box on said gate valve bonnet flange.

2. The adaptor according to claim 1 wherein said arms include a seat located at the same level as the bonnet flange whereby said gate valve operating nut is protected from the surrounding environment.

3. The adaptor according to claim 1 including a resilient ring having the same general configuration as said rectangular ring, said resilient ring being adapted to be mounted on the bonnet flange for cushioning the rectangular ring on the flange.

4. The adaptor according to claim 1 wherein said S-shaped arms provide generally vertical guides outwardly of the key box to positively locate said key box on said arms.

5. The adaptor according to claim 1 wherein said portion engaging said bottom edge of said key box includes a seat adjacent the bonnet flange for engagement by the bottom edge of the key box.

* * * * *